United States Patent

Kronenberg

[15] 3,663,075
[45] May 16, 1972

[54] SELF-CENTERING PERMANENT MAGNET BEARING

[72] Inventor: Klaus J. Kronenberg, Claremont, Calif.
[73] Assignee: General Dynamics Corporation
[22] Filed: Feb. 18, 1971
[21] Appl. No.: 116,355

[52] U.S. Cl. .................................................308/10
[51] Int. Cl. .........................................F16c 39/06
[58] Field of Search ......................308/10; 74/5, 5.7

[56] References Cited

UNITED STATES PATENTS

| | | | |
|---|---|---|---|
| 3,384,427 | 5/1968 | McHugh | 308/10 |
| 2,725,266 | 11/1955 | Mendelsohn | 308/10 |
| 3,216,349 | 11/1965 | Kraft | 308/10 |
| 3,512,851 | 5/1970 | Love | 308/10 |
| 3,447,842 | 6/1969 | Steingroever | 308/10 |
| 2,747,944 | 5/1956 | Bearmann | 308/10 |

*Primary Examiner*—L. T. Hix
*Assistant Examiner*—R. Skudy
*Attorney*—Edward B. Johnson

[57] ABSTRACT

The attracting and repelling forces of a permanent magnet having high coercivity and minimal self-demagnetization are utilized in combination with similar or other types of magnets to provide holding forces to hold or to assist in holding together a permanent magnet bearing assembly utilizing the magnets and to simultaneously provide spacing functions within the assembly for clearance or for centering purposes. The magnets may be linearly or rotatably moved relative to one another or a combination of both movements may be used.

24 Claims, 19 Drawing Figures

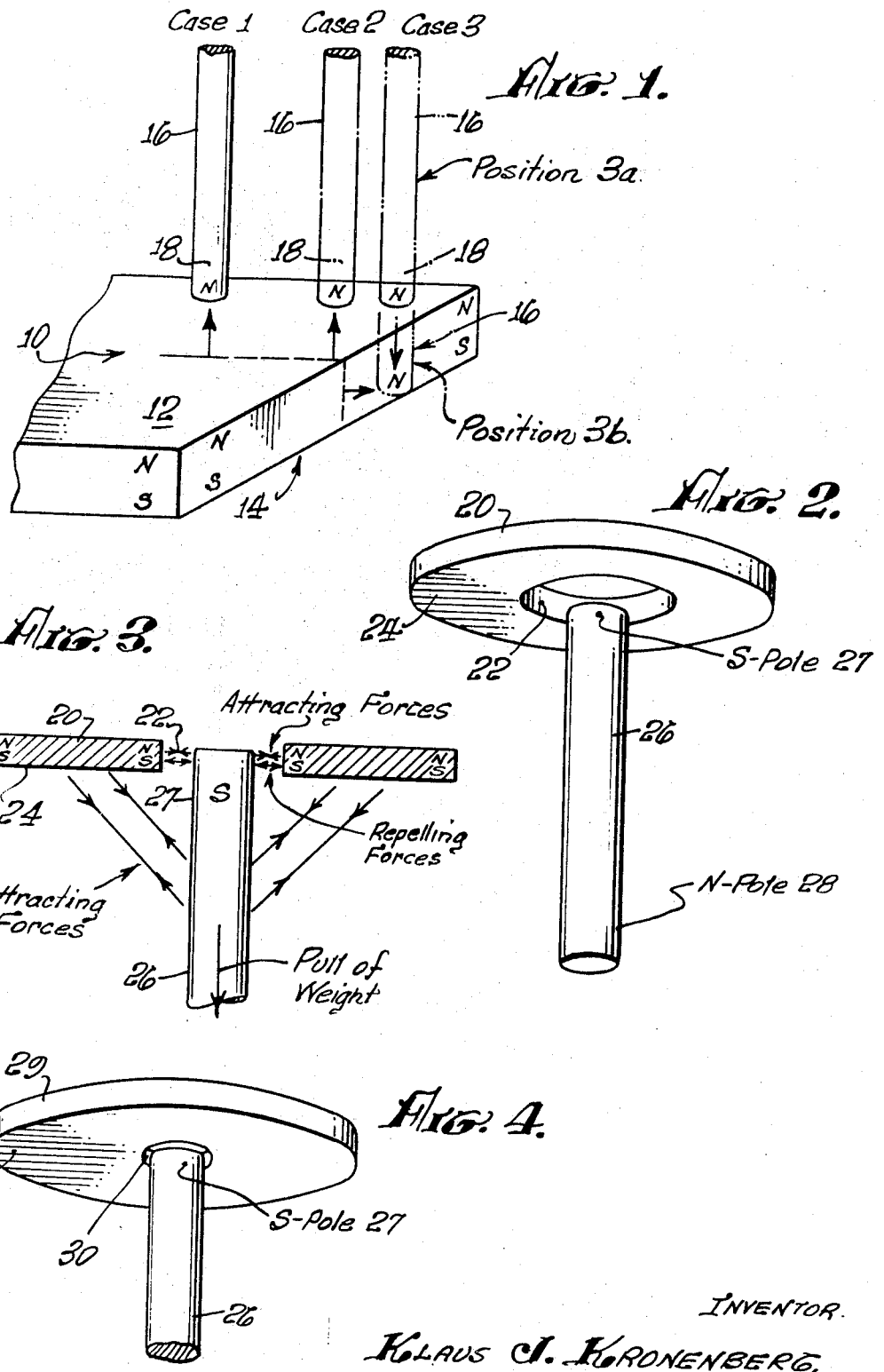

PATENTED MAY 16 1972 3,663,075
SHEET 2 OF 4
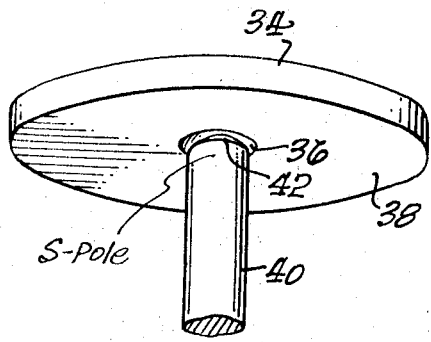
*Fig. 5.*
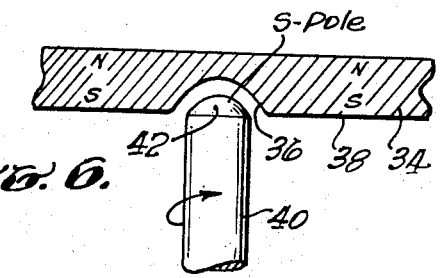
*Fig. 6.*
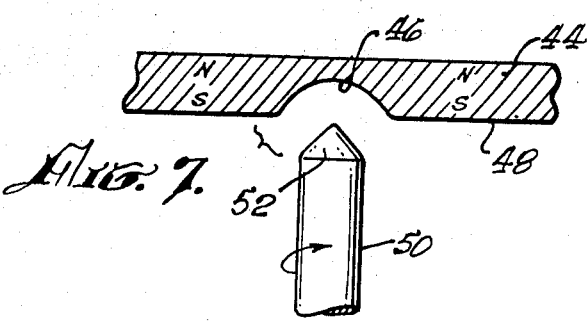
*Fig. 7.*
*Fig. 9.*
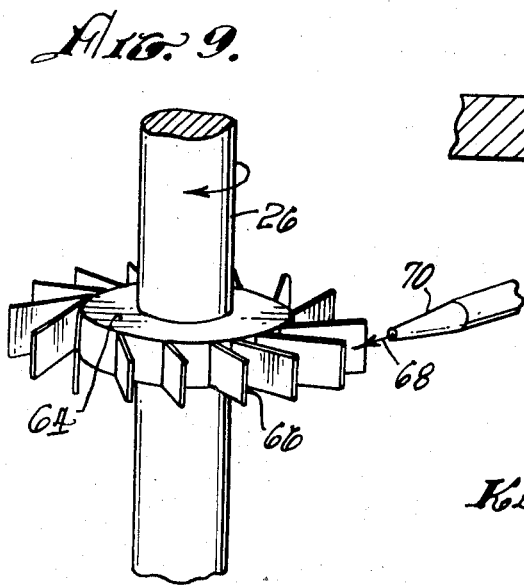
*Fig. 8.*
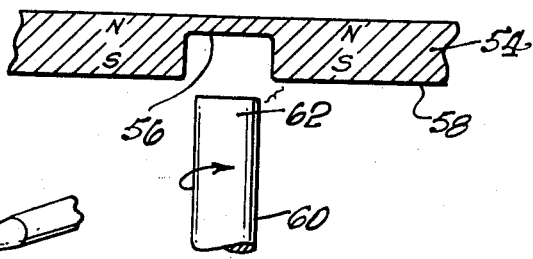
INVENTOR.
Klaus J. Kronenberg,
By Edward B. Johnson
AGENT

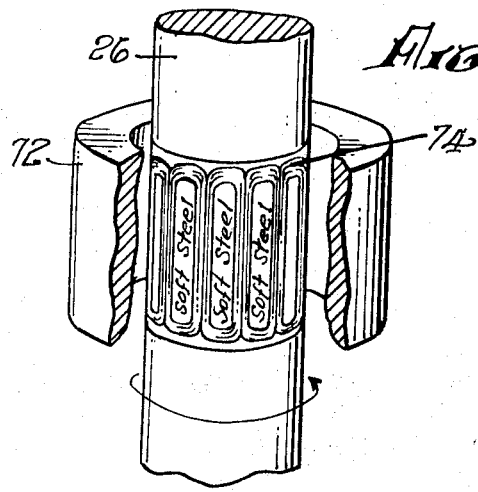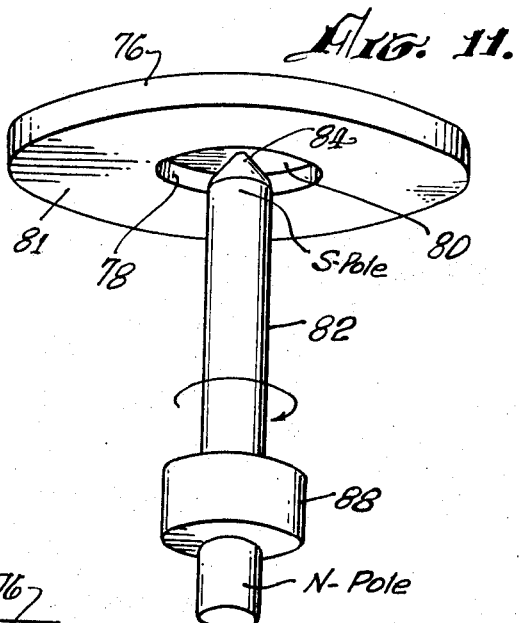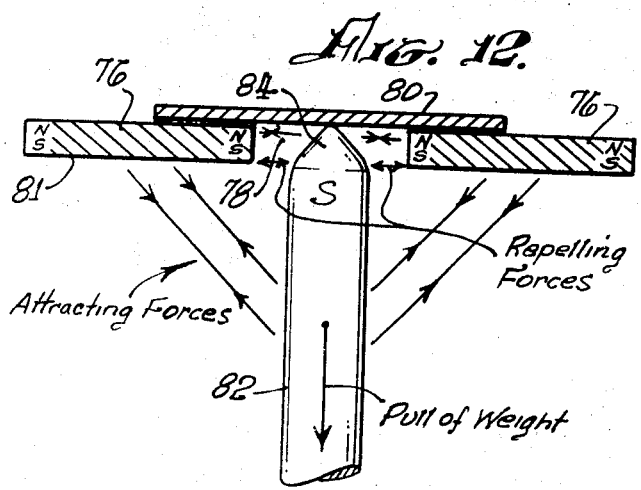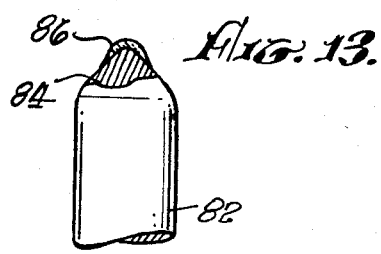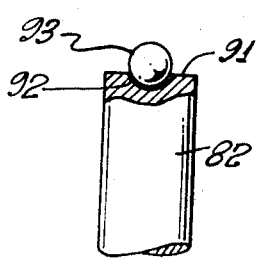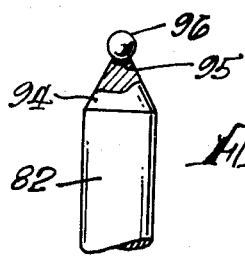

PATENTED MAY 16 1972

INVENTOR.
KLAUS J. KRONENBERG,

By Edward B. Johnson

AGENT 3,663,075

SELF-CENTERING PERMANENT MAGNET BEARING

BACKGROUND OF THE INVENTION

This invention relates generally to the utilization of permanent magnet fields to minimize or eliminate most of the friction from loads and accelerations, and in particular to a self-centering permanent magnet bearing.

In the prior art, there are many anti-friction bearing assemblies which use various types of magnetic field devices to rotatably support one element with respect to another element in an effort to reduce friction. For example, in one attraction suspension system, a permanent cylindrical magnet is secured to a rotatable shaft and then surrounded by a tubular permanent magnet which is fixed to a stator. The two coaxially centered magnets are magnetized in axial directions such that the pole at the axial end of one magnet faces an opposite pole on the axial end of the other magnet. The forces of attraction between the magnets function to suspend the rotor assembly associated with the shaft. In other prior bearing systems, the repelling forces of the magnetic fields of two axially magnetized cylindrical permanent magnets are used to journal a rotor secured to one of the magnets.

Another prior art permanent magnet bearing has two spaced coaxial magnet disks with a space between the disks wherein each disk has one circular magnetic pole on an axially facing surface and one circular magnetic pole on a radially facing surface to create larger pole areas and a high density flux field. A rotatable shaft is fixedly attached in the center of one of the disks so that the shaft and attached disk rotate together. In some cases, jewel bearing arrangements are combined in attempts to additionally decrease friction.

The inherent difficulties with the foregoing systems are discussed in and further exemplified by U.S. Pat. Nos. 3,143,704; 3,157,053, 3,326,610 and 3,512,851. In the prior art systems, only the main total fields of the magnet bodies act on each other and the magnetically acting surfaces of groups of magnets are characterized by similar or equal shapes and sizes. Additionally, the prior art devices use magnetic forces essentially acting in one dimension, pulling or repelling, thus leaving two dimensions for stabilization by mechanical devices. Further, the desired function of magnets according to prior inventions has been dependent upon an exact equilibrium between two counteracting forces and precision machined coacting elements.

SUMMARY OF THE INVENTION

The essential parts of a device based on this invention are two or more permanent magnets which can move in relation to each other. The magnetic fields of these magnets interact in an entirely new way because of the geometrical arrangement of the magnet bodies and their fields. This invention takes advantage for the first time of the peculiar field distribution and the resulting forces in the vicinity of permanent magnet bodies having high coercivity and minimal self-demagnetization that have been magnetized perpendicular to their surfaces. Briefly, in one of its simplest forms, the magnetic bearing of this invention comprises a substantially flat-surfaced stationary permanent magnet which has been magnetized parallel to the axis of rotation such that one end of an associated rotatable permanent magnet is pulled substantially toward the center of a generally centrally located aperture, or a cavity in the flat-surfaced magnet, suspending the rotatable magnet and any associated elements and simultaneously substantially centering the axis of rotation.

Therefore, it is an object of this invention to provide a substantially self-centering permanent magnet bearing.

Another object of this invention is to provide a substantially self-centering permanent magnet bearing which reduces mechanical friction by eliminating or reducing functions of mechanical contacts.

A further object of this invention is to provide a substantially self-centering permanent magnet bearing having magnetic stabilization in two space dimensions perpendicular to each other which necessitates a mechanical hold in only one linear dimension.

Another object of this invention is to provide a substantially self-centering permanent magnet bearing which utilizes a permanent magnet stator together with a permanent magnet rotor, to perform two different functions simultaneously such as the counteracting of weight and the shifting of the axis of rotation into the center of movement magnetically without any mechanical means or guidance.

A further object of this invention is to provide a substantially self-centering permanent magnet bearing having a rotatable permanent magnet that seeks the center of the axis of rotation within a substantially flat-surfaced, non-metallic, permanent magnet stator so that the rotatable magnet can rotate freely around its axis.

Other objects and features of the invention, as well as the many advantages thereof, will be readily apparent to those skilled in the art from a consideration of the following written description and accompanying drawings.

BRIEF DESCRIPTION OF THE DRAWINGS

FIG. 1 is a perspective view of portions of a flat-surfaced permanent magnet and a bar magnet arranged to illustrate the principle of the present invention.

FIG. 2 is a perspective view of one of the embodiments of the novel self-centering permanent magnet bearing.

FIG. 3 is a partial view in sectional elevation of the FIG. 2 embodiment showing the positions of magnetic poles.

FIG. 4 is a fragmentary perspective view showing a modification of the FIG. 2 embodiment.

FIG. 5 is a fragmentary perspective view showing another modification of the FIG. 2 embodiment.

FIG. 6 is a partial view in sectional elevation of the FIG. 5 embodiment.

FIG. 7 is a partial view in sectional elevation showing a variation of the FIG. 5 embodiment.

FIG. 8 is a partial view in sectional elevation of another variation of the FIG. 5 embodiment.

FIG. 9 is a perspective view partially in section showing one possible form of driving power for the present invention.

FIG. 10 is an enlarged, partial cross-sectional view, partially in perspective, showing another possible form of driving power for the present invention.

FIG. 11 is a perspective view of another embodiment of the present invention.

FIG. 12 is a partial view in sectional elevation showing the positions of magnetic poles in the FIG. 11 embodiment.

FIGS. 13–15 are enlarged, fragmentary views in sectional elevation illustrating bearing structure modifications of the present invention.

DESCRIPTION OF THE PREFERRED EMBODIMENTS

Figure 16:
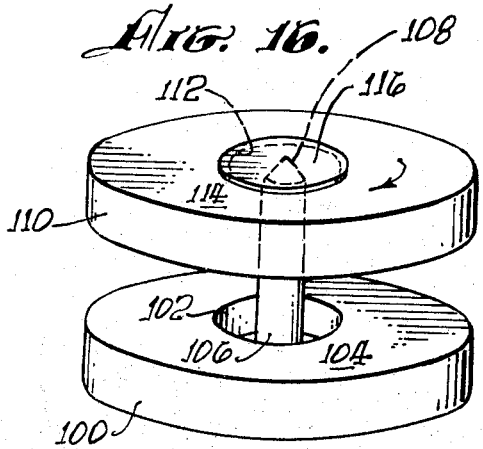
FIG. 16 is a perspective view of still another embodiment of the present invention.

Referring now to the drawings, and more particularly to FIG. 1 which illustrates the principle of the present invention, there is shown a flat-surfaced permanent magnet 10 made of a non-metallic material such as barium ferrite, for example. The permanent magnet 10 is magnetized perpendicular to its extended planes so that its upper or first surface 12 contains the north magnetic pole and its lower or second surface indicated at 14 contains the south magnetic pole. Vertically positioned above the first surface is a permanent bar magnet 16 made of a magnetic material such as alnico 5, for example. Bar magnet 16 is oriented such that its north magnetic pole (N-pole) end 18 is positioned directly above the N-pole or first surface 12 of the flat-surfaced magnet 10. The south magnetic pole (S-pole) of the bar magnet 16 is not shown. In the Case 1 position, as shown in FIG. 1 and as known by those skilled in the art, as bar magnet 16 approaches the first surface 12 of flat-surfaced magnet 10, the N-pole 18 of the bar magnet 16 will experience a repelling force over most of the N-pole surface 12. The repelling force increases with decreasing distance between the first surface 12 and the N-pole of bar magnet 16 as long as the bar magnet 16 approaches the surface 12 somewhere on the first surface 12 away from the edges of flat-surfaced magnet 10. If N-pole of the bar magnet 16 approaches the flat-surfaced magnet 10 close to an edge of the first surface 12, as shown in case 2 in FIG. 1, the aforementioned repelling forces increase only to a certain value and then, on further approach, decrease again. This decrease of the repelling forces may reach zero and then turn into attracting forces. This latter sequence of forces acts on the N-pole of the bar magnet 16 in particular, if the path of approach of the bar magnet 16 to the N-pole surface 12 is somewhat off the first surface 12 so that the N-pole of the bar magnet 16 bypasses an edge of the first surface 12, as shown in case 3, at position 3a. As the approach of the N-pole of the bar magnet 16 continues past the edge of the upper surface 12 toward the lower or second surface 14, as shown in case 3, at position 3b, the attracting forces of the south magnetic pole (S-pole) of the flat-surfaced magnet 10, in the direction of movement, on the bar magnet 16 are particularly strong. At the same time, however, that N-pole portion of the bar magnet 16 nearest the edge of the N-pole surface 12 is locally repelled by the edge in a direction perpendicular to the direction of movement of the bar magnet 16. The position 3b in case 3 illustrates the principle which the present invention uses to achieve its technical goals.

In broadest terms, the principle of the present invention may be stated as follows: The repelling forces between the two similar poles of two permanent magnets usually increase with decreasing distance from each other. For any given magnetic material and its particular magnetic properties, the function of forces between repelling poles and attracting poles depends on the geometry of the magnetic bodies and their position relative to each other. While an elastic spring cannot be made deviating from the essentially inverse proportionality of force and distance, the effect of repelling permanent magnets can be tailored to fit any requirement including complex ones even with a force reversal, variable force coefficient. The effect can be engineered for stationary rotation as well as for translateral motion. The function can be scaled for every conceivable intent, such as, softening blows of direct contact between solids, carrying the bulk of weight, replacing solid elements and mechanical bearings in mechanical devices, smoothing motion in mechanical devices and reducing friction significantly.

The development of ceramic or non-metallic permanent magnets, e.g., barium ferrite magnets and, in addition, magnets made of some of the newer permanent magnet materials, e.g., samarium cobalt, has opened up a new technology which has made possible the designing and construction of the present invention and variations thereof. A non-metallic material such as barium ferrite is an electrical insulator and, accordingly, does not conduct eddy currents, thus avoiding the internal energy loss which is inherent in metallic magnets. The techniques of the present invention cannot be easily realized by using only steel magnets or magnets of the alnico group, or by using only combinations of steel magnets and the alnico group. The newer permanent magnet materials, e.g., barium ferrite, etc., differ from steel and alnico in that they have coercivities (forces resisting reversal of the magnetization) larger than their own magnetic fields. Consequently, barium ferrite magnets, etc., are incapable of demagnetizing or significantly reducing the magnetization of like magnets and so they can function in the repelling mode with unlimited repetition without loss. Amplifying the foregoing in another way, coercive force (or the measure of magnetic hardness) is a decisive quantity defined as that strength of an opposite magnetic field which reduces a magnet's net magnetization to zero. Therefore, if the coercive force of a magnet is higher than the field which the magnet can maintain between its own poles, the magnet cannot demagnetize itself significantly. Since this favorable condition is not present in steel magnets or in alnico magnets, the self-demagnetization tendency has been a main design factor. For example, it has made a certain length of the steel or alnico magnets mandatory in order to keep the self-demagnetizing field small enough, and it has necessitated the formation of horseshoe and C-shaped magnets, in order to have the material of the magnet out of the path of the field. It makes the use of steel or alnico magnets in rotating devices such as motors or generators less favorable, and all but prohibits the use of their repelling forces. In contrast, the barium ferrite magnets (and even less the new rare earth-cobalt magnets) do not provide any field-strength sufficient to reduce their own magnetization significantly. Consequently, they can be used in the form of flat-surfaced discs, or coatings or spheres, for example, and in rotating devices and in the form of repelling pairs. Any mutual magnetization reduction can be only temporary because the magnetization will snap back reversibly. The relative low field densities of the barium ferrites, for example, can provide any desirable electrical or mechanical forces or energies by the utilization of sufficiently large pole areas.

As illustrated in the FIG. 2 embodiment, the inventive self-centering permanent magnet bearing is shown as comprising a stationary, substantially flat-surfaced magnet 20 having an aperture formed therethrough as indicated at 22. It should be understood that, although the stator magnet 20 is shown to be ring-like or disk-like, i.e., with an annular periphery, that the magnet 20 of FIG. 2 and any similar magnets hereinafter described, shown or discussed may be any shape or thickness desired. In some embodiments utilizing the principle of the present invention, the surfaces of the stator magnet may be no thicker than coats of paint, in other embodiments the surfaces may actually be coats of magnetic paint and in some other embodiments the surfaces may be irregular. It should be readily apparent to those skilled in the art that the aperture 22 need not necessarily be circular as shown in FIG. 2 nor need the aperture 22 necessarily be centrally located in the stator magnet 20 and it should be understood that similar apertures, depressions or cavities hereinafter described, shown or discussed should also be so considered. The stator magnet 20 is a permanent magnet made of barium ferrite, for example, and is magnetized perpendicular to its substantially flat surfaces, such that its upper or first surface (not shown in FIG. 2) defines the north magnetic pole (N-pole) and its lower or second surface 24 defines the south magnetic pole (S-pole), as illustrated in FIG. 3. Coaxially suspended substantially within the center, for example, of the aperture 22 is a rotatable permanent bar magnet 26 made of barium ferrite or alnico 5, for example. The rotatable bar magnet 26 is shown to be cylindrical in shape in the FIG. 2 embodiment but as will be understood by those skilled in the art, the bar magnet 26 could be of a variety of shapes as desired. Additionally, and as will also be understood by those skilled in the art, the bar magnet 26 need not necessarily be positioned somewhere within the aperture 22, but may be suspended some distance below the aperture 22 starting at the lower surface 24 of the stator magnet 20. This is also true when the functions of magnets are reversed. FIGS. 7 and 8, discussed hereinafter, are examples of magnet separations. The bar magnet 26 is magnetized such that the south magnetic pole (S-pole) portion or first end 27 is substantially centered, for example, with respect to the aperture 22, as illustrated in FIG. 3. The second end 28 or N-pole portion of the bar magnet 26 is not shown in FIG. 3.

A structural modification of the FIG. 2 embodiment is illustrated in FIG. 4 wherein a stationary, substantially flat-surfaced magnet 29 has been fabricated to have an aperture 30 formed therethrough which is somewhat smaller than the aperture 22 in the stator magnet 20 and is only slightly larger in cross section than the rotatable bar magnet 26. The magnetic forces within the smaller aperture 30 of the stator magnet 29 will act more strongly on the bar magnet 26 and can therefore provide more powerful support and centering force per unit size for the bar magnet 26. The stator magnet 29 is a permanent magnet made of barium ferrite, for example, and is magnetized perpendicular to its substantially flat surfaces in the manner of the stator magnet 20 such that its upper or first surface (not shown in FIG. 4) defines the N-pole and its lower or second surface 32 defines the S-pole, as shown in FIG. 4.

Referring now to FIGS. 5 and 6, another structural modification of the FIG. 2 and 4 embodiments is illustrated in which the apertures 22 and 32, respectively, have been eliminated. In the FIG. 5 modification, there is shown a stationary, substantially flat-surfaced magnet 34 having a substantially parabolic depression, hollow place or cavity 36 formed therein. The stator magnet 34 is a permanent magnet made of barium ferrite, for example, and is magnetized perpendicular to its substantially flat surfaces in the manner of the stator magnets 20 and 28 such that its upper or first surface (not shown in FIG. 5) defines the N-pole and its lower or second surface 38 defines the S-pole, as shown in FIG. 6. Coaxially suspended substantially within the center of the cavity or depression 36 is a rotatable permanent bar magnet 40 made of alnico 5 or barium ferrite, for example, having a substantially parabolic shaped first end portion 42 substantially similar in contour to that of the cavity 36. The rotatable bar magnet 40 is shown to be cylindrical in shape but as is understood by those skilled in the art, the bar magnet 40 could be of a variety of shapes as desired. The bar magnet 40 is magnetized such that its first end 42 defines the S-pole portion, as shown in FIGS. 5 and 6. The second end or N-pole portion of the bar magnet 40 is not shown in either FIGS. 5 or 6. The arrangement of the magnetic poles in the bar magnet 40 is the same as those in the rotatable bar magnet 26 and the FIG. 5 embodiment operates in the same manner as the FIG. 2 and 4 embodiments.

Variations of the FIG. 5 embodiment are illustrated in FIGS. 7 and 8. In FIG. 7, there is shown a stator magnet 44 having a substantially parabolic shaped cavity or depression 46 formed therein. Coaxially suspended with respect to substantially the center of the cavity 46 is a rotatable permanent bar magnet 50 having a substantially conical shaped first end portion 52. In FIG. 8, there is shown a stator magnet 54 having a substantially flat-ended depression or cavity 56 formed therein. Coaxially suspended in relation to substantially the center of the cavity 56 is a rotatable permanent bar magnet 60 having a generally flat-topped first end portion 62 substantially similar in flatness to that of the cavity 56. FIGS. 7 and 8 serve to illustrate that in the embodiments of the present invention and in the variations thereof that the contours of the interiorly formed depressions, apertures and the like in the substantially flat-surfaced magnets need not necessarily be the same as the contours of the associated magnets. FIGS. 7 and 8 further serve to to illustrate that the associated magnets may be suspended some distance below the interiorly formed depressions, apertures and the like in the substantially flat-surfaced magnets. It should be understood and appreciated that except for the differences in cavity shapes and in first end bar magnet shapes, the magnetization, shapes, materials, etc., and operations of the substantially flat magnets 44 and 54 together with their bar magnets 50 and 60, respectively, are similar to the embodiments in FIGS. 2 and 4. In this regard, only the operation of the FIG. 2 embodiment in a rotational environment will be discussed hereinafter and it will be understood that the discussion is applicable to all embodiments from FIG. 2 through FIG. 8. It should also be understood that in some applications of the present invention, motion may not be required in every instance, as, for example, in the suspension and support of gimbals in gyroscopes.

By way of example only, two possible forms of driving power for rotors in the present invention are illustrated in FIGS. 9 and 10. In FIG. 9, there is shown a hub 64, having a plurality of fins or blades 66 associated therewith, fixedly attached to a rotor magnet such as the bar magnet 26. A force of air 68, or other gas, or other fluid, is directed onto the fins 66 through a nozzle 70 from a source (not shown) to rotate the bar magnet 26. In the FIG. 10 example, a wound rotor 74 for a typical induction motor is shown as being built into and fixedly attached to a rotor magnet such as the bar magnet 26 and surrounded by a stator 72. Upon connection to a suitable source of power (not shown) the bar magnet 26 will rotate with the motor rotor 74. Although the bar magnet 26 has been shown in the FIGS. 9 and 10 examples, it should be understood that the bar magnets 40, 50 and 60 of FIGS. 5, 7 and 8, respectively, can be driven in the same manner, if so desired. Other forms and sources of driving power will be apparent to those skilled in the art.

Refer now to FIG. 2, with FIGS. 4–8 in mind. In operation with the rotatable bar magnet 26 being rotated with respect to the aperture 22 or within the aperture 22 of the stator magnet 20 either by a prime mover or other driving source as exemplified in FIGS. 9 and 10, the south magnetic field (S-pole) of the rotor magnet 26 repels the south magnetic field (S-pole) of the stator magnet 20 and the resultant repelling forces tend to center the rotor magnet 26 with respect to the axial center of the aperture 22 from a point somewhere below the aperture 22 up to and within the aperture 22 as applicable, depending upon the utilization and the design paramenters. It should be understood and appreciated that the repelling forces form a magnetic bearing and are functioning in the manner of mechanical bearings and that the repelling forces act as replacements for mechanical bearings. In some devices, utilizing the present invention, mechanical bearings can supplement and/or complement the magnetic bearing. Simultaneously, the attracting forces that exist between the south magnetic field (S-pole) of the rotor magnet 26 and the north magnetic field (N-pole) of the stator magnet 20 tend to pull the rotor magnet 26 all the way through the aperture 22. Additional attracting-pulling forces exist between the S-pole of the stator magnet 20 and the N-pole of the rotor magnet 26. However, the upward pulling forces of the stator magnet 20 on the rotor magnet 26 are counterbalanced by the downward pulling forces caused by the gravitational weight of the rotor magnet 26, and the rotor magnet rotates freely around its longitudinal axis in a virtually frictionless environment therefor. If design requirements so dictate, necessary weight (not shown) may be added to the rotor magnet 26 or supporting journals or bearings (not shown) may be added along the length of the rotor magnet 26. It should be understood that the embodiments shown in FIGS. 4, 5, 7 and 8 will operate in a like manner as described above for the FIG. 2 embodiment. Since permanent magnets function independently of the surrounding medium, frictionless devices based on the present invention can be utilized totally in a vacuum. In some cases, devices based on the present invention may be utilized partially or temporarily in a vacuum. As is readily understood by those skilled in the art, the magnetic poles of the magnets may be reversed and the same results will be obtained and obviously, the stator/rotor functions can be interchanged.

Referring now to FIG. 11, another embodiment of the present invention is shown in which a stator magnet 76, similar in structure to stator magnet 20, is modified by substantially centrally positioning and fixedly mounting a mechanical stop member 80 over an aperture 78 which perforates the stator magnet 76. The mechanical stop member 80 may either be attached to the upper or first surface (not shown in FIG. 11) of the stator magnet 76, as shown more clearly in FIG. 12, or it may be attached to some other element (not shown) which may or may not be capable of adjustment. In addition, the stop member 80 may have a flat bearing surface as indicated in FIGS. 11 and 12 or it may have other configurations up to and including a generally conical-shaped bearing surface or a generally parabolic-shaped bearing surface. Illustrations of some other surfaces have been shown in FIGS. 6, 7 and 8. The stop member 80 may or may not completely cover the aperture 78 and it may be made of glass, for example, or some other material. The stator magnet 76 is a substantially flat-surfaced permanent magnet made of barium ferrite, for example, and is magnetized perpendicular to its substantially flat surfaces such that its upper or first surface (not shown in FIG. 11) defines the north magnetic pole (N-pole) and its lower or second surface 81 defines the south magnetic pole (S-pole), as illustrated in FIG. 12. In some embodiments, the surfaces of the stator magnet may be no thicker than, or may actually be, for instance, magnetic coats of paint, and in other embodiments the surfaces may be irregular. Coaxially suspended substantially within the center of the aperture 78 is a rotatable permanent bar magnet 82 made of alnico 5 or barium ferrite, for example, having a substantially conical-shaped first end portion 84 provided at one end thereof. The rotatable bar magnet 82 may be cylindrical in shape or have some other geometrical configuration as desired. The rotatable bar magnet or rotor magnet 82 is magnetized such that its first end portion 84 defines the S-pole, as shown in FIG. 12. The second end portion or N-pole of the rotor magnet 82 is not shown in FIG. 12. The end area of the substantially conical first end portion 84 may be provided with a low friction bearing 86, as illustrated in FIG. 13. The low friction bearing may be made of glass, for example, and may be pressure fitted, glued, or otherwise mounted on the end area of the substantially conical-shaped portion 84. Many other bearing configurations and first end 84 shapes are possible, including the flat type described in FIG. 8. As a further example, first end portion 84 may tend toward a parabolic shape, as already illustrated in FIGS. 5 and 6. In addition, other low friction bearing mountings may be used as shown in FIG. 14, for example, in which the rotor magnet 82 has been modified to have a flat first end 91 having a depression or cavity 92 formed therein for holding and mounting a glass ball or bead 93 thereon. It should be understood that in practice, a mounting cavity such as 92 is not necessary in some embodiments of the present invention and the glass bead is retained on a completely flat first end during operation. In FIG. 15, by way of further example, the rotor magnet 82 has been modified again to have a substantially conical-shaped end 94 having a depression or cavity 95 formed therein for holding and mounting a glass ball or bead 96 thereon. It should be readily apparent that the bearing structures described hereinabove can be adapted for use with the embodiments shown in FIGS. 5 through 8 and heretofore discussed. If design requirements so dictate, supporting journals or bearings (not shown) may be added along the length of the rotor magnet 82. In the event additional weight is found to be necessary in order to balance the forces between the magnets and the inherent weight of the bar magnet 82, an auxiliary balancing weight 88 is provide and may be mounted on the bar magnet 82, as shown in FIG. 11 for purposes of illustration.

In operation, with the bar magnet rotor 82 being rotated within the aperture 78 of the stator magnet 76 by a prime mover or other driving force as exemplified in FIGS. 9 and 10, the S-pole end of the rotor magnet 82 repels the south magnetic field (S-pole) of the stator magnet 76 and the resultant repelling forces tend to center the bar magnet 82 inside the lower part of the aperture 78. Again it should be understood and appreciated that the repelling forces form a mechanical bearing and are functioning in the manner of mechanical bearings and that the repelling forces act as replacements for mechanical bearings. In some devices, mechanical bearings can supplement and/or complement the magnetic bearing. Simultaneously, the attracting forces that exist between the S-pole of the bar magnet rotor 82 and the north magnetic field (N-pole) of the stator magnet 76 tend to pull the rotor magnet 82 all the way through the aperture 78. Additional attracting-pulling forces exist between the S-pole of the stator magnet 76 and the N-pole of the rotor magnet 82. However, the upward pulling force of the N-pole of the stator magnet 76 on the S-pole of the rotor magnet 82 is counterbalanced by the downward pulling force of the weight of the rotor magnet 82. In addition, and at the same time, the substantially conical portion 84 of the rotor magnet 82 can abut or touch the mechanical stop member 80, thus limiting, as necessary, the upward pulling forces, and the rotor magnet 82 rotates freely about its longitudinal axis. Addition of low friction bearings, such as bearing 86, on the end area of the substantially conical portion 84 further decreases the friction between the conical portion 84 and the mechanical stop member 80, when and if the two elements come in contact; especially if both the bearing 86 and the mechanical stop 80 are made of glass, for example. The producing of this friction is limited only to a defining function of the rotation, not to the function itself. Consequently, it can be eliminated by balancing the forces between the magnets and the weight or other forces with the same or similar effects. However, in many instances, the controlling feature of the mechanical stop 80 will be advantageous in limiting the upward pulling forces of the magnets. As in the case of the FIG. 2 embodiment, the embodiments shown in FIGS. 4 through 15 may be of any size, configuration, magnetization or material consistent with the operation described hereinabove.

The embodiments illustrated by FIGS. 2-15 can support a rotating movement with little restriction as to additional sideways movements as nutations, oscillations and precessions. They can also be utilized in conjunction with other devices permitting such rotations, for example, bearings, air bearings, gimbals and magnetic bearings. In particular, could the lower end of the bar magnet 82 be exposed to the repelling fields of a disk-like magnet.

Figure 17:
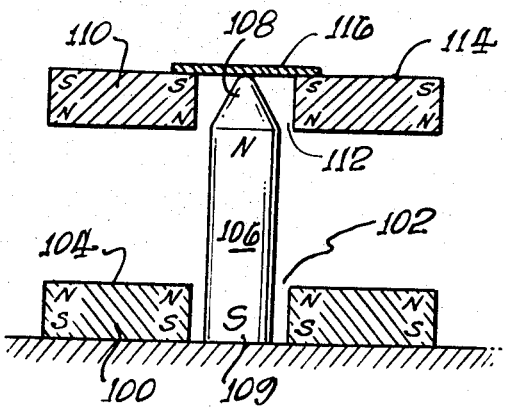
FIG. 17 is a view in sectional elevation showing the positions of magnetic poles in the FIG. 16 embodiment.

Another embodiment of the present invention is illustrated in FIG. 16, with the magnetic field orientation of the component parts shown in FIG. 17. Referring now to FIGS. 16 and 17, the additional embodiment includes a first, stationary, substantially flat-surfaced magnet 100 having an aperture indicated at 102. The first stator magnet 100 is a permanent magnet made of barium ferrite, for example, and is magnetized perpendicular to its substantially flat surfaces such that its upper or first surface 104 defines the N-pole and its lower or second surface (not shown) defines the S-pole, as shown in FIG. 17. Fixedly mounted substantially coaxially within the aperture 102 of the first stator magnet 100 is a second, stationary, permanent magnet 106 made of alnico 5, for example, having a substantially conically shaped portion 108 provided at its first end thereof. The substantially conical portion 108 may be provided with a glass bearing, for example, similar to that shown in FIGS. 13 or 15 and described hereinabove in connection with the FIG. 11 embodiment and should be so construed as being provided with a glass bearing should such a low friction bearing be desirable. In addition, the substantially conically shaped portion 108 may tend toward a definite parabolic shape if desired or required and, in addition, may be modified to include the bearing surfaces and structures described hereinabove for FIGS. 5-7 and 13-15. The second stator magnet 106 is a bar magnet and is shown to be cylindrical in shape in the FIG. 16 embodiment but as is known by those skilled in the art, the second stator magnet 106 could be formed in a variety of shapes as desired. The second stator magnet 106 is magnetized such that its first end, i.e., the conical shaped portion 108, defines the N-pole and its second end 109 defines the S-pole, as shown in FIG. 17. The second end 109 is fixedly mounted substantially within the center of the aperture 102 within the first stator magnet 100, as illustrated in FIG. 17. Rotatably mounted above the first stator magnet 100, and substantially parallel and substantially coaxial with it, is a second substantially flat-surfaced magnet 110 having an aperture as indicated at 112. The flat magnet rotor 110 is positioned such that the conical N-pole end 108 of the second stator magnet 106 is substantially centered within the aperture 112, as illustrated in FIG. 17. The rotatable flat-surfaced magnet 110 is a permanent magnet made of barium ferrite, for example, and is magnetized perpendicular to its substantially flat surfaces such that its upper or first surface 114 defines the S-pole and its lower or second surface (not shown in FIG. 16) defines the N-pole, as illustrated in FIG. 17. The rotor magnet 110 is rotatably positioned and centered above the first stator magnet 100 at a distance substantially determined by the strength of the repelling forces between their like poles, —their N-poles in the illustrated example. The strength of the repelling forces between the rotor magnet 110 and the first stator magnet 100 also substantially determines the axial length of the second stator magnet 106. Consequently, it can be readily seen by those skilled in the art and from a reading of the descriptive matter hereinbefore presented that through the selective design of magnetic materials and strengths that the rotor magnet 110 will be rotating above the first stator magnet 100 at a distance representing substantially the far limits of the repelling forces between the two magnets capable of supporting the rotor magnet 110 with a degree of contact in some cases, or with no contact in other cases, on the substantially conical portion 108 of the second stator magnet 106. Substantially centrally positioned and fixedly mounted over the aperture 112 of the rotor magnet 110 is a mechanical stop member 116. The mechanical stop member 116 may either be attached to the upper or first surface 114 of the rotor magnet 110, as shown in FIG. 17, or it may be attached to another support element (not shown) which may or may not be capable of adjustment. In addition, the mechanical stop member 116 may have a flat bearing surface as shown in FIGS. 16 and 17 or it may have other configurations up to and including a generally parabolic-shaped bearing surface or a generally conical-shaped bearing surface. Illustrations of some other surfaces are shown in FIGS. 6, 7, and 8. The stop member 116 may or may not completely cover the aperture 112 and it may be made of glass, for example, or some other material. In addition, in operation, the stop member 116 may or may not be contacted by the first end portion 108 of the second stator magnet 106.

There may be instances which are dependent upon the structural stability desired when the repelling forces of the first stator magnet 100 relative to the rotor magnet 110 will not be necessary and the first stator magnet 100 can be eliminated. This could occur when the amount of frictional contact between the stop member 116 and the first end portion 108 of the second stator magnet 106 is considered to be of no consequence. In such a case, the rotor magnet would rotate while the stop member 116 would be in substantially continuous contact with the first end portion 108 of the second stator magnet 106. Elimination of the first stator magnet 100 could also occur if the power means to drive the rotor magnet 110 were to be mounted together with the rotor magnet 110 such that the rotor magnet 110 could rotate in a substantially fixed plane with the stop member 116 either slightly above the first end portion 108 of the second stator 106 or in contact with the first end portion 108, and in the event that there would be no contact with the stop member 116, the stop member 116 could be eliminated too. Elimination of the first stator magnet 100 could again occur when, due to selected design criteria, a balance of forces would be created whereby the attracting forces and the repelling forces within the aperture 112, for example, of the rotor magnet 110 would be balanced to cause the rotor magnet to, in effect, float in position around the first end 108 of the second stator magnet 106, and in the event that there would be no contact with the stop member 116, the stop member 116 could be eliminated too.

It should be understood that although the magnets 100 and 110 of FIG. 16 are shown to be built in the manner of rings or disks, that is, with an annular periphery, that the magnets 100 and 110 may be any shape or thickness desired. In some embodiments utilizing the principle of the present invention, the surfaces of magnets such as 100 and 110 may be no thicker than, or actually may be coats of paint and in other embodiments the surfaces may be irregular. It should also be readily apparent to those skilled in the art that the apertures 102 and 112 need not necessarily be circular as illustrated in FIG. 16 nor is it deemed necessary that the apertures 102 and 112 be always substantially centrally located within the magnets 100 and 110, respectively, as shown. Further, in some embodiments, the first stator magnet 100 may have no apertures or the like and the second stator 106 would be fixedly mounted perpendicular to the first surface 104 of the first stator magnet 100.

Figure 18:
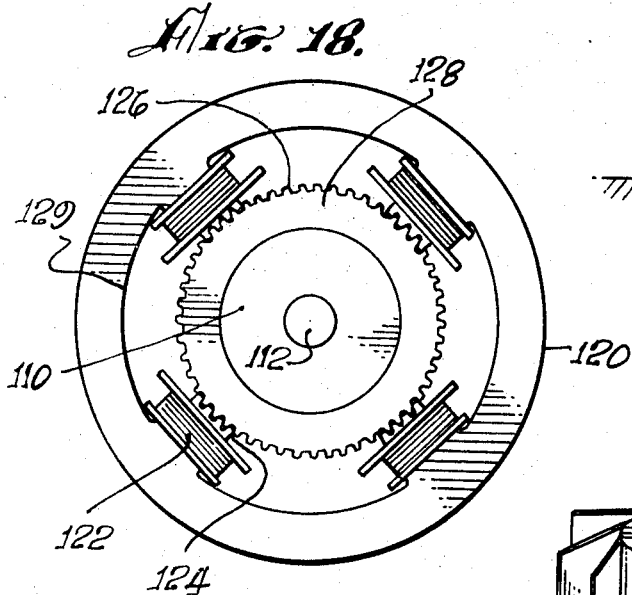
FIG. 18 is a partial plan view, partially in perspective, showing one possible form of driving power for the FIG. 16 embodiment.
Figure 19:
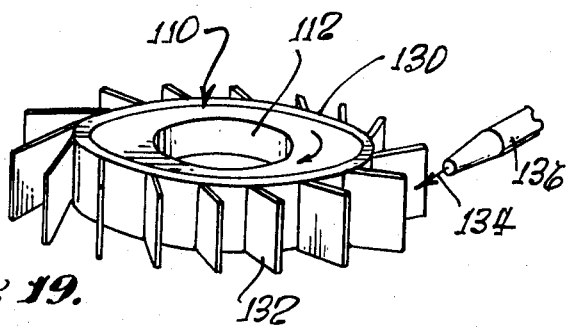
FIG. 19 is a perspective view partially in section showing another possible form of driving power for the FIG. 16 embodiment.

By way of example only, two possible forms of driving power for the rotor magnet 110 are illustrated in FIGS. 18 and 19. In FIG. 18, there is shown a standard two-phase, phonic-wheel synchronous motor 120 having stator coil windings 122 each having a slotted tooth structure 124 which engage a matching slotted tooth structure 126 on a magnetized rotor 128. Fixedly mounted for rotation substantially within the center of the magnetized motor rotor 128 is the rotor magnet 110. Electric wires 129, connected to a power source (not shown), are interconnected with the stator coil windings 122 to provide the necessary field. The stator in a two-phase phonic-wheel synchronous motor is usually wound as a two-phase induction motor. The line-up of magnetic poles in the motor is such that the slotted magnetized rotor will advance one tooth or magnetic pole each time the rotating field of the stator passes through one complete cycle, — thus maintaining the maximum pull between the rotating field of the stator and the magnetized rotor. In the FIG. 19 example, there is shown a ring structure 130 having fixedly attached thereon a plurality of fins or blades 132. The inner periphery of the ring structure 130 is pressure fitted, or otherwise affixed, around the outer periphery of the rotor magnet 110. A force of air 134, or hot gases, or other fluid, is directed onto the fins 132 through a nozzle 136 from a source (not shown) to rotate the rotor magnet 110.

In operation, with the rotor magnet 110 being rotated by a prime mover or other driving source as exemplified in FIGS. 18 and 19, the rotor magnet 100 rotates around the substantially conical portion 108 of the second stator magnet 106 while, at the same time, the repelling forces between the rotor magnet 110 and the first stator magnet 100 substantially maintain the magnets 110 and 100 at a predetermined distance apart to maintain the structural integrity of the assembly. The N-pole or first end of the second stator magnet 106 repels the north magnetic field (N-pole) of the rotor magnet 110 and the resultant repelling forces tend to center the aperture 112 of the rotor magnet 110 around the N-pole end of the second stator 106. Once again it should be understood and appreciated that the repelling forces form a magnetic bearing and are functioning in the manner of mechanical bearings and that the repelling forces are acting as replacements for mechanical bearings. In some devices, mechanical bearings can supplement and/or complement the magnetic bearing. Simultaneously, the attracting forces that exist between the N-pole end of the second stator magnet 106 and the S-pole portion of the rotor magnet 110 tend to pull the rotor magnet 110 down toward the substantially conically shaped portion 108 of the second stator magnet 106. However, the downward pulling force of the N-pole end of the second stator magnet 106 on the S-pole portion of the rotor magnet 110 is counterbalanced by the repelling forces between the rotor magnet 110 and the first stator magnet 100. In addition, and at the same time, the mechanical stop 116 can abut or touch the substantially conically shaped portion 108 of the second stator magnet 106, thus limiting, as necessary, the downward pulling forces, and the rotor magnet 110 rotates freely about its radial axis. Addition of a low friction bearing on the end area of the substantially conical portion 108 of the second stator 106 such as the bearing 86 shown in FIG. 13 and described hereinabove, or similarly in FIGS. 14 and 15, further decreases the friction between the substantially conically shaped portion 108 and the mechanical stop member 116, when and if the two elements come in contact, especially if both the bearing and the mechanical stop member 116 are made of glass. The producing of this friction is limited only to a defining function of the rotation, not to the function itself. Consequently, the friction can be eliminated by balancing the forces between all of the magnets and the weight of the rotor magnet 110. However, in many instances, the controlling feature of the mechanical stop member 116 will be advantageous in limiting the downward pulling force between the S-pole portion of the rotor magnet 110 and the N-pole end of the second stator magnet 106.

As is readily understood by those skilled in the art, the magnetic poles of the magnets may be reversed, consistent with design goals, and the same results will be obtained and obviously, the stator/rotor functions can be interchanged. In addition, the second stator magnet 106 could also be made of barium ferrite, thus eliminating most or all eddy current development in that magnet too.

As is now readily apparent, a particularly new concept of permanent magnet utilization has been shown and described hereinabove wherein the systematic use of the magnetic field distribution around permanent magnet bodies provides for a variety of force functions depending on the shape of the body and the approach or movement of a magnetic body within the magnetic field. For example, and for simplicity, referring back to the FIG. 2 embodiment, the force function acting on the entire rotor magnet 26 (the vector resultant of all field vectors between the stator magnet 20 and the rotor magnet 26) is one of attraction through the aperture 22 of the stator magnet 20. In contrast, the local force function acting on the S-pole end of the rotor magnet 26 is a repelling force toward the rim of the aperture 22. The forces between permanent magnets change significantly with different geometries of approaches and, as in the embodiment hereinabove described, may even change signs (positive to negative). Force functions such as these may be specifically designed for any particular purpose or movement such as linear, rotating, or combinations of movements. Such force functions also permit immediate, continuous control of the forces and resulting movements.

Additional modifications or embodiments of the present invention would include functions in rotating, or generally accelerated modes, as well as linear modes or a combination of both, or changes of modes with time. Devices hanging down in suspension and devices standing upright on tracks, bearings and rails are some generaly examples. Combinations of devices can provide support at both ends of an axle or on many locations in between, also an unlimited number of points or uniform support over any length. Propelling a motor by microwave energy transfer is considered feasible now for utilization with the embodiments of the present invention. Some specific examples of devices which may utilize the present invention in a rotating mode are: gyros, gimbal bearings, flywheels, rotating antenna holders for space vehicles and aircraft, turntables for phonographs, motors, generators, meters, counters, mixers, gears and instrumentation in any environment. Some specific examples of devices which may utilize the present invention in a linear mode are: vehicles on rails, sleds, lifts, elevators, escalators and miscellaneous sliding devices such as doors, phonograph playheads, and so forth. Utilization of the present invention results in a lack of friction, wear and shock, and eliminates the need for lubricants, axles, bearings and springs in many embodiments.

I claim:

1. A self-centering permanent magnet bearing device comprising:
    a first permanent magnet of a material having extremely high coercivity and no self-demagnetization, said first permanent magnet having first and second surfaces defining first and second magnetic poles, respectively, of opposite polarity, said first permanent magnet magnetized perpendicularly to said surfaces, said first permanent magnet additionally having constituent means interiorly formed therein for providing a magnetic bearing thereabout,
    a second permanent magnet having first and second ends of opposite polarity, said first end of said second magnet having a polarity opposite to that of said first magnetic pole of said first magnet and a polarity identical to that of said second magnetic pole of said first magnet, and said first end of said second magnet being substantially centrally positioned generally in longitudinal alignment with respect to said interiorly formed means in said first magnet, said first and second magnets being substantially simultaneously responsive to the attracting and repelling forces existing between said first and second magnets for simultaneously suspending and substantially centering said first end of said second magnet with respect to said interiorly formed means in said first magnet.

2. A self-centering permanent magnet bearing device as defined in claim 1, wherein said interiorly formed means in said first magnet is an aperture therethrough.

3. A self-centering permanent magnet bearing device as defined in claim 1, wherein said interiorly formed means in said first magnet is a depression therein.

4. A self-centering permanent magnet bearing device as defined in claim 1, wherein said first and second surfaces of said first magnet are substantially flat surfaces.

5. A self-centering permanent magnet bearing device as defined in claim 1, wherein said second magnet is a bar magnet.

6. A self-centering permanent magnet bearing device comprising:
    a permanent magnet stator of a material having extremely high coercivity and no self-demagnetization, said stator magnet having first and second surfaces defining first and second magnetic poles, respectively, of opposite polarity, said stator magnet magnetized perpendicularly to said surface, said stator magnet additionally having constituent means interiorly formed therein for providing a magnetic bearing thereabout,
    a permanent magnet rotor having first and second ends of opposite polarity, said first end of said rotor magnet having a polarity opposite to that of said first magnetic pole of said stator magnet and a polarity identical to that of said second magnetic pole of said stator magnet, and said first end of said rotor magnet being substantially centrally positioned for rotation about an axis generally in longitudinal alignment with respect to said interiorly formed means in said stator magnet, said rotor magnet being substantially simultaneously responsive to the attracting and repelling forces existing between said rotor magnet and said stator magnet for simultaneously suspending and substantially centering said rotor magnet about its axis of rotation.

7. A self-centering permanent magnet bearing device as defined in claim 6, wherein said interiorly formed means in said stator magnet is an aperture therethrough.

8. A self-centering permanent magnet bearing device as defined in claim 6, wherein said interiorly formed means in said stator magnet is a depression therein.

9. A self-centering permanent magnet bearing device as defined in claim 6, including power means connected to rotate said rotor magnet about said axis.

10. A self-centering permanent magnet bearing device as defined in claim 6, wherein said first and second surfaces of said stator magnet are substantially flat surfaces.

11. A self-centering permanent magnet bearing device as defined in claim 8, wherein said depression in said stator magnet is a substantially parabolic cavity therein.

12. A self-centering permanent magnet bearing device as defined in claim 8, wherein said depression in said stator magnet is a substantially conical cavity therein.

13. A self-centering permanent magnet bearing device as defined in claim 8, wherein said depression in said stator magnet is a substantially flat-ended cavity therein.

14. A self-centering permanent magnet bearing device as defined in claim 8, including bearing means associated with said first end of said rotor magnet for potential contact with said depression in said stator.

15. A self-centering permanent magnet bearing device comprising:

a permanent magnet stator of a material having extremely high coercivity and no self-demagnetization, said stator magnet having first and second surfaces defining first and second magnetic poles, respectively, of opposite polarity, said stator magnet magnetized perpendicularly to said surfaces, said stator magnet additionally having an aperture formed therein through said surfaces for providing a magnetic bearing thereabout, a stop member mounted over said aperture of said stator magnet, a permanent magnet rotor having first and second ends of opposite polarity, said first end of said rotor magnet having a polarity opposite to that of said first magnetic pole of said stator magnet and a polarity identical to that of said second magnetic pole of said stator magnet, bearing surface means associated with said first end of said rotor magnet for potential contact with said stop member, and said first end of said rotor magnet being substantially centrally positioned for rotation about an axis generally in longitudinal alignment with respect to said aperture in said stator magnet, said rotor magnet being substantially simultaneously responsive to the attracting and repelling forces existing between said rotor magnet and said stator magnet for simultaneously suspending and substantially centering said rotor magnet about its axis of rotation.

16. A self-centering permanent magnet bearing device as defined in claim 15, wherein said first and second surfaces of said stator magnet are substantially flat surfaces.

17. A self-centering permanent magnet bearing device as defined in claim 15, wherein said bearing surface means includes a glass bearing.

18. A self-centering permanent magnet bearing device as defined in claim 15, including power means connected to rotate said rotor magnet about said axis.

19. A self-centering permanent magnet bearing device comprising:

a permanent magnet rotor of a material having extremely high coercivity and no self-demagnetization, said rotor magnet having first and second surfaces defining first and second magnetic poles, respectively, of opposite polarity, said rotor magnet magnetized perpendicularly to said surfaces, said rotor magnet additionally having constituent means interiorly formed therein for providing a magnetic bearing thereabout, a permanent magnet stator having first and second ends of opposite polarity, said first end of said stator magnet having a polarity opposite to that of said first magnetic pole of said rotor magnet and a polarity identical to that of said second magnetic pole of said rotor magnet, and said rotor magnet being positioned for rotation about an axis with said first end of said stator magnet being substantially centrally positioned generally in longitudinal alignment with respect to said interiorly formed means in said rotor magnet, said rotor magnet being substantially simultaneously responsive to the attracting and repelling forces existing between said stator magnet and said rotor magnet for simultaneously suspending and substantially centering said rotor magnet about its axis of rotation.

20. The self-centering permanent magnet bearing device as defined in claim 19, including power means connected to rotate said rotor magnet about said axis.

21. A self-centering permanent magnet bearing device comprising:

a first permanent magnet stator having first and second surfaces defining first and second magnetic poles, respectively, of opposite polarity, said first stator magnet magnetized perpendicularly to said surfaces, a permanent magnet rotor of a material having extremely high coercivity and no self-demagnetization, said rotor magnet substantially coaxially positioned for rotation about an axis above said first stator magnet, said rotor magnet having first and second surfaces defining first and second magnetic poles, respectively, of opposite polarity, said rotor magnet magnetized perpendicularly to said surfaces, said first magnetic poles of said rotor magnet having a polarity opposite to that of said first magnetic pole of said first stator magnet, said second magnetic pole of said rotor magnet having a polarity identical to that of said first magnetic pole of said first stator magnet, said rotor magnet additionally having constituent means interiorly formed therein for providing a magnetic bearing thereabout, a second permanent magnet stator having first and second ends of opposite polarity, said second end of said second stator magnet having a polarity opposite to that of said first magnetic pole of said first stator magnet and a polarity identical to that of said second magnetic pole of said first stator magnet, said second end of said second stator magnet fixedly mounted in generally longitudinal alignment substantially perpendicular to said surfaces of said first stator magnet, said first end of said second stator magnet having a polarity opposite to that of said first magnetic pole of said rotor magnet and a polarity identical to that of said second magnetic pole of said rotor magnet, and said first end of said second stator magnet fixedly positioned and substantially centered in generally longitudinal alignment with respect to said interiorly formed means in said rotor magnet, said rotor magnet being substantially simultaneously responsive to the repelling forces existing between said first stator magnet and said rotor magnet and to the attracting and repelling forces existing between said second stator magnet and said rotor magnet for simultaneously suspending and substantially centering said rotor magnet about its axis of rotation.

22. The self-centering permanent magnet bearing device as defined in claim 21, including power means connected to rotate said rotor magnet about said axis.

23. A self-centering permanent magnet bearing device comprising:

a first permanent magnet stator having first and second surfaces defining first and second magnetic poles, respectively, of opposite polarity, said first stator magnet magnetized perpendicularly to said surfaces, a permanent magnet rotor of a material having extremely high coercivity and no self-demagnetization, said rotor magnet substantially coaxially positioned for rotation about an axis above said first stator magnet, said rotor magnet having first and second surfaces defining first and second magnetic poles, respectively, of opposite polarity, said rotor magnet magnetized perpendicularly to said surfaces, said first magnetic pole of said rotor magnet having a polarity opposite to that of said first magnetic pole of said first stator magnet, said second magnetic pole of said rotor magnet having a polarity identical to that of said first magnetic pole of said first stator magnet, said rotor magnet additionally having an aperture formed therein through said surfaces, for providing a magnetic bearing thereabout.

a stop member mounted over said aperture in said rotor magnet, a second permanent magnet stator having first and second ends of opposite polarity, said second end of said second stator magnet having a polarity opposite to that of said first magnetic pole of said first stator magnet and a polarity identical to that of said second magnetic pole of said first stator magnet, said second end of said second stator magnet fixedly mounted in generally longitudinal alignment substantially perpendicular to said surfaces of said first stator magnet, said first end of said second stator having a polarity opposite to that of said first magnetic pole of said rotor magnet and a polarity identical to that of said second magnetic pole of said rotor magnet, and said first end of said second stator magnet fixedly positioned and substantially centered in generally longitudinal alignment with respect to said aperture in rotor magnet, said rotor magnet being substantially simultaneously responsive to the repelling forces existing between said first stator magnet and said rotor magnet and to the attracting and repelling forces existing between said second stator magnet and said rotor magnet for simultaneously suspending and substantially centering said rotor magnet about its axis of rotation.

24. The self-centering permanent magnet bearing device as defined in claim 23, including power means connected to rotate said rotor magnet about said axis.

* * * * *